United States Patent [19]
Pratt

[11] Patent Number: 5,692,865
[45] Date of Patent: Dec. 2, 1997

[54] QUICK RELEASE FASTENER SYSTEM

[75] Inventor: John D. Pratt, Laguna Niguel, Calif.

[73] Assignee: Textron Inc., Providence, R.I.

[21] Appl. No.: 663,625

[22] Filed: Jun. 14, 1996

[51] Int. Cl.[6] .................... F16B 13/06; F16B 19/00
[52] U.S. Cl. .................... 411/55; 411/60; 411/354; 411/517; 403/370; 403/371
[58] Field of Search .................... 411/55, 57, 60, 411/271, 354, 371, 392, 383, 516, 517; 403/370, 371

[56] References Cited

U.S. PATENT DOCUMENTS

| | | | |
|---|---|---|---|
| 705,571 | 7/1902 | Ferguson | 411/354 |
| 2,331,555 | 10/1943 | Jostich, Jr. et al. | 411/55 X |
| 3,042,094 | 7/1962 | Liljeberg | 411/271 |
| 3,175,455 | 3/1965 | Reddy | 403/371 X |
| 3,603,626 | 9/1971 | Whiteside | 411/60 X |
| 4,623,277 | 11/1986 | Wayne et al. | 403/371 |
| 5,474,403 | 12/1995 | Hetrich | 403/371 X |
| 5,486,079 | 1/1996 | Martin et al. | 411/392 |

FOREIGN PATENT DOCUMENTS

| | | | |
|---|---|---|---|
| 2245326 | 1/1992 | United Kingdom | 411/60 |

*Primary Examiner*—Neill R. Wilson
*Attorney, Agent, or Firm*—Trexler, Bushnell, Giangiorgi & Blackstone, Ltd.

[57] ABSTRACT

A novel quick release fastener system for efficient and reliable attachment, disengagement and reattachment of one or more work pieces secured by the fastener system. The fastener system includes a bolt and a nut. The bolt includes a shank with a head on one end with a leading end on the shank opposite the head. The nut has a wall which generally defines a bore having opposed edges which define a slot at least partially extending through the wall. Displacement structures are provided on the nut which provide a mechanical advantage in translating rotary and axial forces into circumferential and radial forces. Threads are provided on at least the nut for promoting axial displacement for engaging and disengaging the displacement structures. Threaded engagement and disengagement of the displacement structures deform or release the wall of the nut resulting in displacement of the opposed edges of the wall. In one embodiment the nut includes a constricting gripper which is threadedly engaged with a driving body. The gripper includes displacement structures which cause the gripper to be compressively engaged with an outside surface of the shank of the bolt when the driving body is rotated. In a second embodiment of the invention, the nut includes threads on an interior surface of the wall which engage threads on an external surface of the leading end of the bolt. Engagement of the threads causes the displacement structures to expand the wall of the nut to engage a bore of the work piece in which the nut is inserted. In both embodiments the displacement structures and threads are configured to provide frictional engagement.

20 Claims, 2 Drawing Sheets

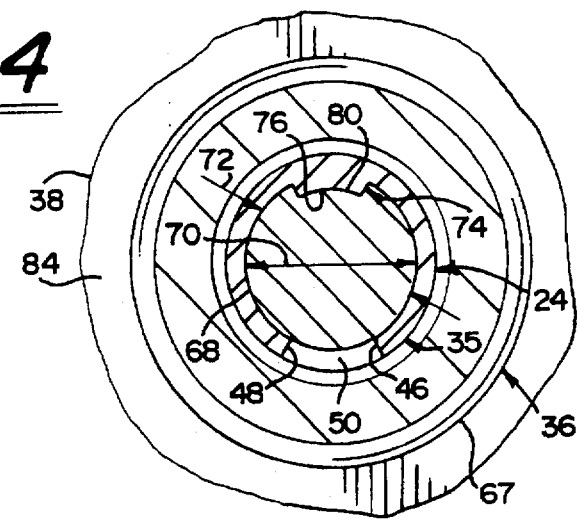
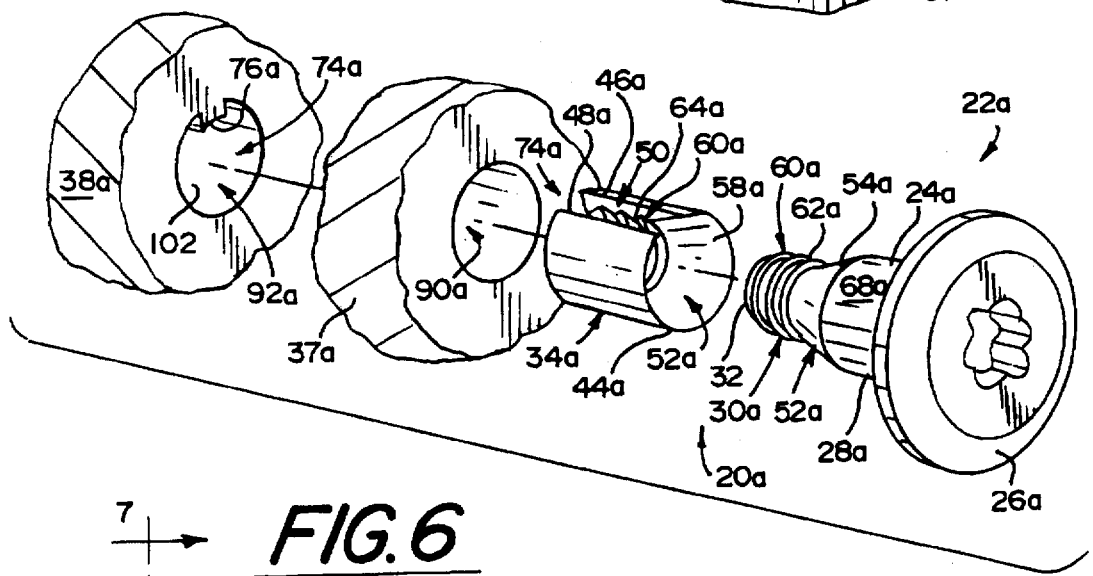
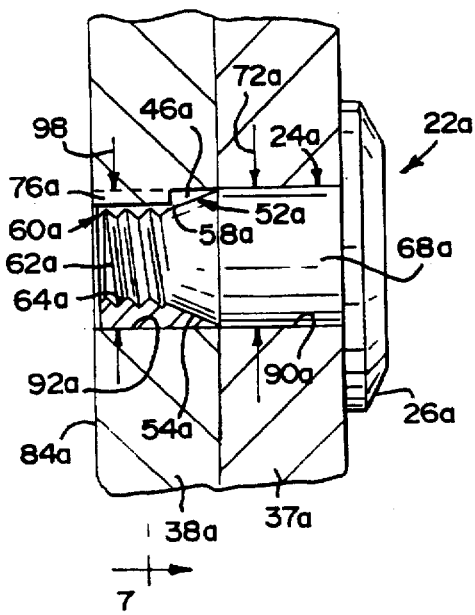
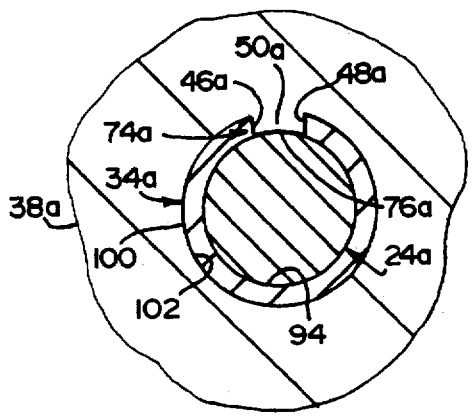

QUICK RELEASE FASTENER SYSTEM

BACKGROUND

The present invention is generally directed to a novel quick release, quick attachment fastener system. The present invention relates to a fastener system which includes a bolt and a nut or gripper which produce either outward or inward radial forces to provide frictional engagement with one or more work pieces. More particularly, the present invention relates to a fastener system for use in quickly and easily attaching and removing the fastener system components from one or more work pieces.

In a variety of applications it is desirable to provide quick and reliable attachment of a fastener system to one or more work pieces. However, prior art fastener systems, while generally providing a reliable fastener connection, often require considerable time to attach the fastener to the work pieces. For example, prior art screw or bolt-type fasteners require numerous rotations in order to engage the threaded shank of the fastener with a work piece. Additionally, depending on the type of material employed, the material may need to be pre-drilled and threaded in order to receive the threads of the screw or bolt-type fastener.

In situations where it is desirable to quickly engage a fastener, such prior art threaded fasteners may not permit sufficiently quick fastening. Further, such situations may also require that the fastener system be quickly and easily disengaged. As should be expected, prior art fastening systems require numerous rotations of the fastener in order to disengage the threaded fastener from the corresponding work pieces. As such, there is a need for a fastener system which provides quick, easy, and reliable engagement or attachment of the fastener system to a work piece as well as quick and easy removal or disengagement of the fastener from the work piece.

OBJECTS AND SUMMARY

A general object satisfied by the claimed invention is to provide a fastener system for rapid, efficient and reliable fastening of work pieces.

A general object satisfied by the claimed invention is to provide a fastener system for rapid and efficient disengagement from work pieces retained thereby.

Briefly, and in accordance with the foregoing, the present invention envisions a novel quick release fastener system for efficient and reliable attachment, disengagement and reattachment of one or more work pieces secured by the fastener system. The fastener system includes a bolt and a nut. The bolt includes a shank with a head on one end with a leading end on the shank opposite the head. The nut has a wall which generally defines a bore having opposed edges which define a slot at least partially extending through the wall. Displacement structures are provided on the nut which provide a mechanical advantage in translating rotary and axial forces into circumferential and radial forces. Threads are provided on at least the nut for promoting axial displacement for engaging and disengaging the displacement structures. Threaded engagement and disengagement of the displacement structures deform or release the wall of the nut resulting in displacement of the opposed edges of the wall. In one embodiment the nut includes a constricting gripper which is threadedly engaged with a driving body. The gripper includes displacement structures which cause the gripper to be compressively engaged with an outside surface of the shank of the bolt when the drving body is rotated. In a second embodiment of the invention, the nut includes threads on an interior surface of the wall which engage threads on an external surface of the leading end of the bolt. Engagement of the threads causes the displacement structures to expand the wall of the nut to engage a bore of the work piece in which the nut is inserted. In both embodiments the displacement structures and threads are configured to provide frictional engagement.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 4 is partial fragmentary, cross-sectional view taken along line 4—4 in FIG. 2;

FIG. 5 is an illustration similar to that as shown in FIG. 1 showing an exploded perspective view of second embodiment of the novel quick release fastener system of the present invention showing a bolt and a nut axially aligned for engagement with first and second work pieces;

FIG. 6 is an enlarged, partial fragmentary, cross-sectional, side elevational view of the novel quick release fastener system as shown in FIG. 5 in which the bolt and the expandable gripper have been assembled and engage the first and second work pieces; and FIG. 7 is partial fragmentary, cross-sectional view taken along line 7—7 in FIG. 6.

DESCRIPTION

Figures 1, 2, 3:
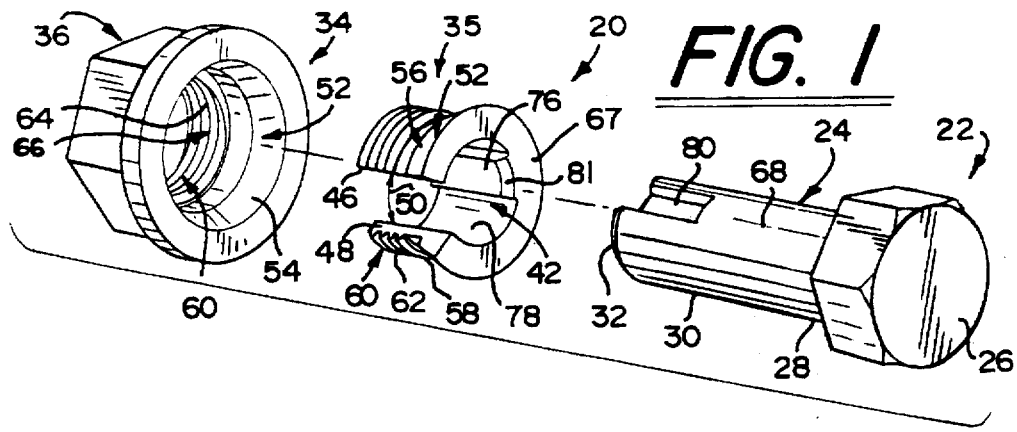
FIG. 1 is an exploded perspective view of the novel quick release fastener system of the present invention showing a bolt, a driving body and a constricting gripper axially aligned for engagement, the gripper in this view has been rotated relative to the bolt to more clearly show the structure of a slot and a key thereon.
FIG. 2 is an enlarged, partial fragmentary, cross-sectional, side elevational view of the novel quick release fastener system as shown in FIG. 1 in which the bolt, constricting gripper and driving body have been assembled and engage first and second work pieces.
FIG. 3 is a partial fragmentary, cross-sectional, side elevational view of the novel quick release fastener system as shown in FIGS. 1 and 2 and in which the driving body has been rotated relative to the constricting gripper to loosen the gripper from the shank of the bolt and the driving body and the constricting gripper retained thereon have been removed from a shank of the bolt.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

As shown in FIGS. 1–7, the present invention is a novel fastener system 20, 20a. It should be noted that FIGS. 1–4 illustrate a first embodiment of the fastener system 20 and FIGS. 5–7 illustrate a second embodiment of the fastener system 20a. The same reference numerals will be used to identify like elements in the two embodiments with the addition of an alphabetic suffix (i.e. 20a) to identify the second embodiment as shown in FIGS. 5–7.

Turning now to the embodiment as shown in FIGS. 1–4, the fastener system 20 includes a bolt 22 having a shank 24 with a head 26 on a first end 28 thereof and an leading end 30 on a second end 32 thereof. The fastener system 20 also includes a nut 34 for engagement with the bolt 22 to attach the fastener system 20 to at least one work piece. The nut 34 of this fastener system includes a gripper 35 and a driving body 36 which engages a portion of the gripper 35 to deform the gripper 35 as described in detail herinbelow. As shown in FIG. 2 the fastener system engages a first work piece 37 and a second work piece 38. With further reference to FIGS. 2–4, the gripper 35 of the nut 34 has a wall 40 generally defining a bore 42. The wall 40 defines an entry end 34 for receiving the leading end 30 of the bolt 22. The wall 40 also defines axially disposed opposed edges 46, 48 which define a slot 50 at least partially extending through the gripper 35.

Displacement structure 52 is provided on the nut 34 to provide a mechanical advantage in translating rotary and axial forces into circumferential and radial forces. In the embodiment as shown in FIGS. 1–4, the displacement structure 52 includes a gripper tapered surface 54 on an exterior surface 56 of the gripper 35 and a drive tapered surface 58 positioned generally toward the entry end 44 of the driving body 36.

The nut 34 also includes threads 60 for engaging and disengaging the displacement structure 52. The threads 60 include an external thread 62 disposed on the exterior surface 56 of the gripper 35 and an internal thread 64 disposed on an interior surface 66 of the driving body 36. With reference to FIGS. 2 and 3, the external and internal threads 62, 64 are from a complementary form. It should also be noted, that the threads 60 may be provided on only one of the gripper 35 or driving body 36 with the opposing surface being formed of a suitable deformable material in which threads may be formed or cut. As such, the individual thread form will be of a construction generally known in the art which is sufficient to deform the opposing material.

The gripper tapered surface 54 tapers inwardly from a rim 67 of the gripper 35 towards the external threads 62. The drive tapered surface 58 tapers outwardly from the interior surface 66 of the driving body 36 towards the entry end 44. In the preferred embodiment, the gripper and drive tapered surfaces 54, 58 are both beveled surfaces although other surface combinations can be used consistent with the teachings of the inventions set forth herein.

Once the threads 60 are engaged, the driving body 36 is operated to engage and disengage the gripper and drive tapered surfaces 54, 58. Engagement of the tapered surfaces causes the wall 30 of the gripper 35 to be deformed and generally, inwardly radially constrict on the exterior surface 68 of the shank 24 of the bolt 22. The constriction of the gripper 35 around the shank 24 of the bolt 22 creates a frictional engagement of the gripper 35 on the bolt 22 thereby retaining the nut 34 on the bolt 22 and the fastener system 20 relative to the work pieces 37, 38.

With reference to FIGS. 2 and 3, an internal diameter 70 of the bore 42 of the gripper 35 is substantially equal to an external diameter 72 of the shank 24. The substantial similarity in dimensions 70, 72 assures that a minimum amount of deformation of the gripper 35 will provide frictional engagement of the gripper 35 on the bolt 22. As shown in FIG. 3, the nut 34 is provided with the gripper 35 threadedly engaged in the driving body 36 resulting in the nut 34 being frictionally engaged relative to the bolt 22 to retain the fastener system on the work pieces.

Alignment structures 74 are provided to axially align the nut 34 and the bolt 22 to prevent rotation of the gripper 35 relative to the bolt 22 when the driving body 36 is rotated on the gripper 35 to engage the bolt 22. The alignment structures 74 include a key 76 on an interior surface 78 of the gripper 35 and a channel 80 in the exterior surface 68 of the bolt 22. The channel 80 extends from the first end 32 along the leading end 30. A chamfered edge 81 on the front end of the key 76 to facilitate ease of engagement in the channel 80. The channel 80 has a length 82 which is sufficient to engage the key 76 therein. The length 82 is selected to be flush with or slightly recessed from a face 84 of the second work piece 38 to allow a rim 86 of the gripper 35 to securely abut the face 84.

The embodiment of the fastener system 20 as shown in FIGS. 1–4 requires minimum rotation of the driving body 36 relative to the gripper 35 to cause the gripper 35 to constrict the bolt 22. It is desirable to size and dimension the external and internal threads 62, 64 to provide engagement of the gripper and drive tapered surfaces 54, 58 upon rotation of the driving body 36 approximately 90° relative to the gripper 35. This minimum, "quarter turn", engagement provides for fast and efficient attachment and frictional engagement of the nut 34 on the bolt 22. The size and dimension of the threads 62, 64 is such that a quarter turn or 90° rotation of the driving body 36 relative to the gripper 35 will axially move the driving body 36 along the gripper 35 to close a gap 88 (see FIG. 3) between the tapered surfaces 54, 58. Disengagement of the tapered surfaces 54, 58 releases the deforming forces which result when the surfaces 54, 58 are engaged.

In use, the fastener system 20 as shown in FIGS. 1–4 is employed to engage work pieces 37, 38 as shown in FIGS. 2 and 3. The work pieces 37, 38 are provided with corresponding bores 90, 92 in which the shank 24 of the bolt is inserted. The leading end 30 of the bolt 22 extends from the face 84 of the work piece 38. The channel 80 is exposed for engagement with the key 76 of the gripper 35. The driving body 36 is rotated to advance the engagement or operate the threads 62, 64 thereby engaging the tapered surfaces 54, 58. Engagement of the tapered surfaces 54, 58 causes the wall 40 to be deformed and creates a circumferential, generally radially inwardly directed constricting force. The constricting force frictionally engages the interior surface 78 of the gripper 35 with the exterior surface 68 of the leading end 30.

Having described the first embodiment of the fastener system 20 hereinabove we now turn to the second embodiment of the fastener system as shown in FIGS. 5–7. As shown in FIG. 5 the second embodiment of the fastener system 20a includes a bolt 22a having a shank 24a with a head 26a on a first end 28a and a leading end 30a on a second end 32a. The fastener system 20a includes a nut 34a for engagement with the bolt 22a to attach the fastener system 20a to one or more work pieces 37a, 38a. The nut 34a has a wall 40a which generally defines a bore 32a therein. The wall 40a defines an entry end 44a for receiving the leading end 30a of the bolt 22a. The wall 40a has axially disposed opposed edges 46a, 48a defining a slot 50a therebetween. The slot 50a at least partially extends through the wail 40a, and, in the preferred embodiment as shown in FIG. 5–7, the slot 50a extends completely through the wail 40a.

Displacement structure 52a is provided on the fastener system 20a to provide a mechanical advantage in translating rotary and axial forces into circumferential radial forces as will be described in greater detail hereinbelow. The displacement structure 52a as shown in FIGS. 5–7 includes a nut tapered surface 58a on an interior surface 94 of the nut 34a and a bolt tapered surface 54a positioned on an exterior surface 68a of the bolt 22a. Threads 60a are provided on the fastener system 20a for axially displacing and engaging the nut or bolt 34a, 22a for engaging and disengaging the displacement structure 52a. Operation of the threads 60a deforms and releases the wail 40a of the nut 34a and displaces the opposed edges 46a, 48a of the wail 40a.

As can be seen from the illustrations and the description provided hereinabove, the structure and function of the two embodiments of the novel fastener systems of the present invention are substantially similar and work on substantially the same general principles. The general principles are that the bolt and nut operate by using threads to engage displacement structures to radially deform the wall of the nut. In the first embodiment shown in FIGS. 1–4, the nut includes a gripper which is inwardly radially constricted as a result of the action of the driving body threadedly attached to the gripper. Operation of the driving body circumferentially engages an external surface of the bolt. In the second embodiment as shown in FIGS. 5–7, the nut is engaged by the bolt to outwardly radially expand the nut to frictionally engage the surfaces of the bore or bores engaged by the fastener system.

With the foregoing similarities in mind, we will proceed to further discuss the additional similarities and the differences of the second embodiment relative to the first embodiment. As shown in FIGS. 5 and 6, the threads 60a include an external thread 62a formed on the leading end 30a of the shank 24a and internal thread 64a formed on the interior surface 94 of the nut 34a. The external and internal threads 62a, 64a are engaged to bring the tapered surfaces 54a, 58a into close position. Rotation or engagement of the bolt 22a in the nut 34a results in engaging the tapered surfaces 54a, 58a to produce a circumferential, radially outwardly expansion force on the nut 34a.

The external diameter 72a of the bolt 22a is substantially equal to the external diameter 98 of the nut 34a in a relaxed or unexpanded condition. In this manner, the nut 34a and bolt 22a are easily inserted into the apertures 90a, 92a of one or more work pieces 37a, 38a having a single diameter. However, engagement of the tapered surfaces 54a, 58a will result in increasing the diameter 98 of the nut 34a. The expansion mechanism of the displacement structures 52a generally outwardly radially expand the nut 34a to create circumferential expansion forces which frictionally engage an exterior surface 100 of the nut 34a with an interior surface 102 of the bore 92a in the work piece 38a.

The threads 62a, 64a are sized and dimensioned for engaging the bolt tapered surface 54a with the nut tapered surface 58a upon a 90° rotation of the bolt 22a relative to the nut 34a. This 90° rotation or quarter turn of the bolt relative to the nut helps promote quick and easy engagement and disengagement of the fastener system 20a from the work pieces 37a, 38a. To further facilitate ease of engagement and disengagement, alignment structures 74a are provided on the nut 34a and the bore 104. The alignment structures as shown in FIGS. 5–7 include a key 76a positioned in the bore 104 for engagement with the slot 50a. As shown in FIG. 6, the key 76a is sized and dimensioned to prevent interfering with the engagement of the tapered surfaces 54a, 58a. Further, the key 76a may be sized and dimensioned to prevent interfering with the operation of the external threads 62a with the internal threads 64a. Alternatively, if desired, the key 76a may extend into the thread path to create a degree of interference with the threads 62a.

It should also be noted that with regard to both embodiments (the first embodiment as shown in FIGS. 1–4 and the second embodiment as shown in FIGS. 5–7) the alignment structures 74, 74a may include suitably sized and dimensioned, complementary, polygonal surfaces. The polygonal surfaces prevent rotation while engaging the fastener system 20, 20a with a work piece. Such a polygonal surface construction may include triangular, square, hexagonal, octagonal, multi-lobular and any other desirable configuration. It should be noted, however, that the arcuate surfaces as shown in FIGS. 1–7 and the alignment structures including a key 76, 76a and a corresponding channel 80 or groove 50a, respectively, has been shown in order to provide the most basic form of these structures. Additionally, the arcuate surface structures tend to promote more even distribution of the circumferential forces created by the displacement structure 52, 52a. However, it is appreciated in the present application that other surface structures may be used and function well depending on the circumstances of use and the desired results.

In use, the second embodiment of the fastener system 20a includes threading the nut 34a onto the bolt 22a to a point before abutment and engagement of the displacement structures 52a. The fastener system 20a is then inserted into the corresponding bore or bores 90a, 92a. While inserting the fastener system 20a, the slot 50a is aligned with the key 76a to prevent rotation once the bolt 22a is rotated relative to the nut 34a. Rotation of the bolt 22a in the nut 34a causes the tapered surfaces 54a, 58a to engage. Continued rotation of the bolt 22a and the nut 34a further operates the threads 60a producing circumferential outward radial forces between the exterior surface 100 of the nut 34a and the interior surface 102 of the bore 92a.

Removal of the fastener system 20a from the bores 90a, 92a is similarly quick and efficient. Rotation of the bolt 22a to operate threads to disengage the displacement structure 52a relieves the forces from the nut 34a. Disengagement of the tapered surfaces 54a, 58a removes the stress placed on the wall 40a which created the frictional engagement between the exterior surface 100 and the interior 102. Once the circumferential outward radial forces have been sufficiently removed, the entire fastener assembly 20a may be axially withdrawn from the bores 90a, 92a.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

The invention claimed is:

1. A fastener system comprising:
   a bolt having a shank with a head on a first end thereof and a leading end on a second end thereof;
   a nut for engagement with said bolt attach said fastener system to at least one work piece, said nut having a wall generally defining a bore therein, said wall having an entry end for receiving said leading end of said bolt, and said wall having axially disposed opposed edges defining a slot at least partially extending therethrough;
   a gripper of said nut for abutting and engaging an exterior surface of said bolt;
   a driving body of said nut having an interior surface defining an aperture for receiving a portion of said gripper;
   threads on at least said nut for axially displacing one of said nut and said bolt for engaging and disengaging said displacement structure for deforming and releasing said wall of said nut and displacing said opposed edges of said wall;
   said threads being disposed on at least one of an exterior surface of said gripper and said interior surface of said driving body; and a displacement structure being disposed on at least one of said driving body and said gripper for providing a mechanical advantage in translating rotary and axial forces into radial forces, engagement of said gripper with said driving body and operation of said threads axially displacing said gripper relative to said driving body and generally inwardly radially constricting said gripper to frictionally engage an exterior surface of said bolt.

2. A fastener system as recited in claim 1, further comprising:

alignment structures on said gripper and said bolt for aligning said gripper with said bolt and for preventing rotation of said gripper relative to said bolt upon rotation of driving body relative to said gripper.

3. A fastener system as recited in claim 2, said alignment structures further comprising:

a key on said interior surface of said gripper and a channel in said exterior surface of said bolt, said key engaging said channel for preventing rotation of said gripper relative to said bolt upon rotation of said driving body threadedly engaged with said gripper.

4. A fastener system as recited in claim 1, further comprising:

said threads including external threads on said exterior surface of said gripper and internal threads on said interior surface of said driving body;

said displacement structure including a gripper tapered surface on said exterior surface of said gripper, said gripper tapered surface tapering inwardly towards said external threads, and a drive tapered surface on an entry end of said driving body, said drive tapered surface tapering outwardly from said interior surface of said driving body towards said entry end; and whereby rotation of said driving body relative to said gripper transferring forces to said driving tapered surface and said gripper tapered surface for generally inwardly radially constricting said gripper on said exterior surface of said bolt.

5. A fastener system as recited in claim 4, said external threads and said internal threads being dimensioned for deforming said gripper once said drive tapered surface and said gripper tapered surface are in abutment upon rotation of said driving body approximately 90° relative to said gripper.

6. A fastener system comprising:

a bolt having a shank with a head on a first end thereof and a leading end on a second end thereof;

a nut for engagement with said bolt to attach said fastener system to at least one work piece, said nut having a wall generally defining a bore therein, said wall having an entry end for receiving said leading end of said bolt, and said wall having axially disposed opposed edges defining a slot at least partially extending therethrough;

threads on at least said nut for axially displacing one of said nut and said bolt for engaging and disengaging said displacement structure for deforming and releasing said wall of said nut and displacing said opposed edges of said wall;

said threads being disposed on at least one of an exterior surface of said bolt and and an interior surface of said nut; and a displacement structure being disposed on at least one of said nut and said bolt for providing a mechanical advantage in translating rotary and axial forces into radial forces, engagement of said nut with said bolt and operation of said threads axially displacing said bolt relative to said nut and generally outwardly radially expanding said nut to frictionally engage an interior surface of a bore in a work piece in which said nut is positioned.

7. A fastener system as recited in claim 6, further comprising:

alignment structures on said nut and in a bore in a work piece with which said fastener system is to be attached, said alignment structures preventing rotation of said nut relative to said bore upon rotation of said bolt relative to said nut.

8. A fastener system as recited in claim 7, said alignment structures further comprising:

a key positioned in said bore for engagement with said slot in said nut, said key and said slot being axially aligned and generally axially engaged for preventing rotation of said nut relative to said bore upon rotation of bolt in said nut.

9. A fastener system as recited in claim 6, further comprising:

said threads including external threads on said leading end of said bolt and internal threads on an interior surface of said wall of said nut;

said displacement structure including a bolt tapered surface on said bolt between said external threads and said head, said bolt tapered surface tapering inwardly towards said external threads, and a nut tapered surface on said entry end of said wall of said nut, said nut tapered surface tapering outwardly from said interior surface of said wall towards said entry end; and whereby rotation of said bolt in said nut transferring forces to said bolt tapered surface and said nut tapered surface for generally outwardly radially expanding said wall of said nut.

10. A fastener system as recited in claim 9, said external threads and said internal threads being dimensioned for engaging said bolt tapered surface and said nut tapered surface upon rotation of said bolt approximately 90° relative to said nut.

11. A fastener system for attachment to at least one work piece, said fastener system comprising:

a bolt having a shank with a head on a first end thereof and a leading end on a second end thereof;

a gripper for abutting and engaging an exterior surface of said bolt, said gripper having a wall generally defining a bore therein, said wall having an entry end for receiving said leading end of said bolt, and said wall having axially disposed opposed edges defining a slot at least partially extending therethrough;

a driving body having an interior surface defining an aperture for receiving a portion of said gripper;

complementary threads on an exterior surface of said gripper and on an interior surface of said driving body for engaging said driving body with said gripper; and displacement structure on said gripper and said driving body for providing a mechanical advantage in circumferentially constricting said gripper on said exterior surface of said bolt.

12. A fastener system as recited in claim 11, further comprising:

alignment structures on said gripper and said bolt for aligning said gripper with said bolt and for preventing rotation of said gripper relative to said bolt upon rotation of driving body relative to said gripper.

13. A fastener system as recited in claim 12, said alignment structures further comprising:

a key on said interior surface of said gripper and a channel in said exterior surface of said bolt, said key engaging said channel for preventing rotation of said gripper relative to said bolt upon rotation of said driving body relative to said gripper.

14. A fastener system as recited in claim 11, said displacement structure further comprising:

a gripper beveled surface on said exterior surface of said gripper, said gripper beveled surface angling inwardly towards said external threads, and a drive beveled surface on an entry end of said driving body, said drive beveled surface angling outwardly from said interior surface of said driving body towards said entry end; and whereby rotation of said driving body relative to said gripper transferring forces to said drive beveled surface and said gripper beveled surface for generally inwardly radially constricting said gripper on said exterior surface of said bolt.

15. A fastener system as recited in claim 14, said external threads and said internal threads being dimensioned for engaging said drive beveled surface and said gripper beveled surface upon rotation of said driving body approximately 90° relative to said gripper.

16. A fastener system comprising:

a bolt having a shank with a head on a first end thereof and a leading end on a second end thereof;

a nut for engagement with said bolt to attach said fastener system to at least one work piece, said nut having a wall generally defining a bore therein, said wall having an entry end for receiving said leading end of said bolt, and said wall having axially disposed opposed edges defining a slot at least partially extending therethrough;

complementary external threads disposed on an exterior surface of said leading end of said bolt and internal threads disposed on an interior surface of said nut; and displacement structure on said interior surface of said nut and on said bolt spaced away from said exterior threads, said displacement structure providing a mechanical advantage in circumferentially expanding said nut to frictionally engage an interior surface of a bore in which said nut is positioned.

17. A fastener system as recited in claim 16, further comprising:

alignment structures on said nut and in a bore in a work piece with which said fastener system is to be attached, said alignment structures preventing rotation of said nut relative to said bore upon rotation of said bolt relative to said nut.

18. A fastener system as recited in claim 17, said alignment structures further comprising:

a key positioned in said bore for engagement with said slot in said nut, said key and said slot being axially aligned and generally axially engaged for preventing rotation of said nut relative to said bore upon rotation of bolt in said nut.

19. A fastener system as recited in claim 16, further comprising:

said displacement structure including a bolt beveled surface on said bolt between said external threads and said head, said bolt beveled surface tapering inwardly towards said external threads, and a nut beveled surface on said entry end of said wall of said nut, said nut beveled surface tapering outwardly from said interior surface of said wall towards said entry end; and whereby rotation of said bolt in said nut transferring forces to said bolt beveled surface and said nut beveled surface for generally outwardly radially expanding said wall of said nut.

20. A fastener system as recited in claim 19, said external threads and said internal threads being dimensioned for deforming said nut once said bolt beveled surface and said nut beveled surface are in abutment upon rotation of said bolt approximately 90° relative to said nut.

\* \* \* \* \*

UNITED STATES PATENT AND TRADEMARK OFFICE
CERTIFICATE OF CORRECTION

PATENT NO. : 5,692,865
DATED : December 2, 1997
INVENTOR(S) : John D. Pratt

It is certified that error appears in the above-indentified patent and that said Letters Patent is hereby corrected as shown below:

Column 4, Line 57 "wail" should be -- wall --
Column 4, Line 58 "wail" should be -- wall --
Column 5, Line 3 "wail" should be -- wall --
Column 5, Line 4 "wail" should be --wall --
Column 6, Line 49 "bolt attach" should be --bolt to attach --
Column 8, Line 47 "wail" should be -- wall --

Signed and Sealed this

Twenty-sixth Day of May, 1998

Attest:

BRUCE LEHMAN

Attesting Officer

Commissioner of Patents and Trademarks